Figure 1:
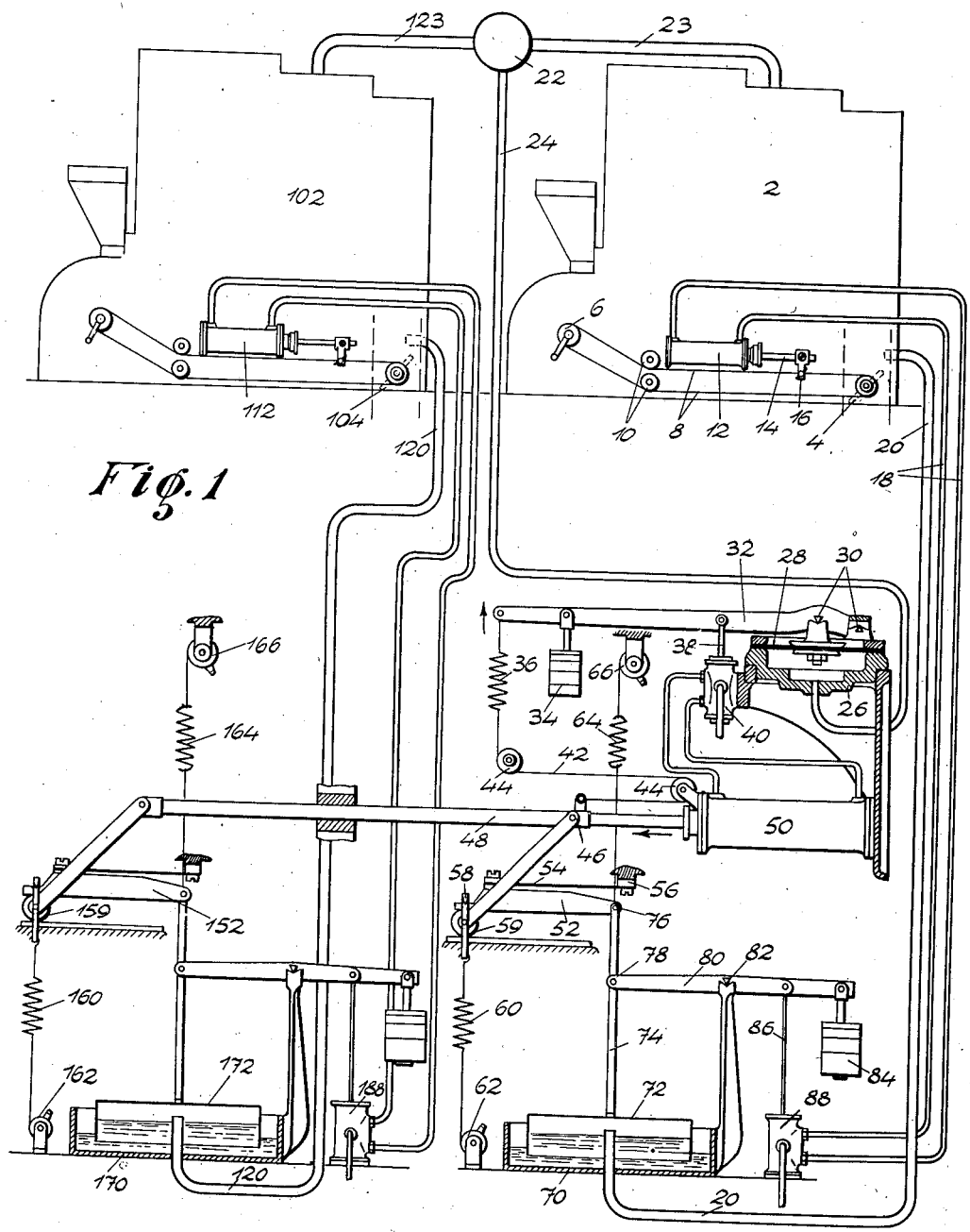

Dec. 18, 1928.  
E. ROUČKA  
1,695,470  
MEANS FOR REGULATING COMBUSTION  
Filed April 20, 1925   3 Sheets-Sheet 1

INVENTOR  
ERICH ROUČKA  
BY  
ATTORNEYS.

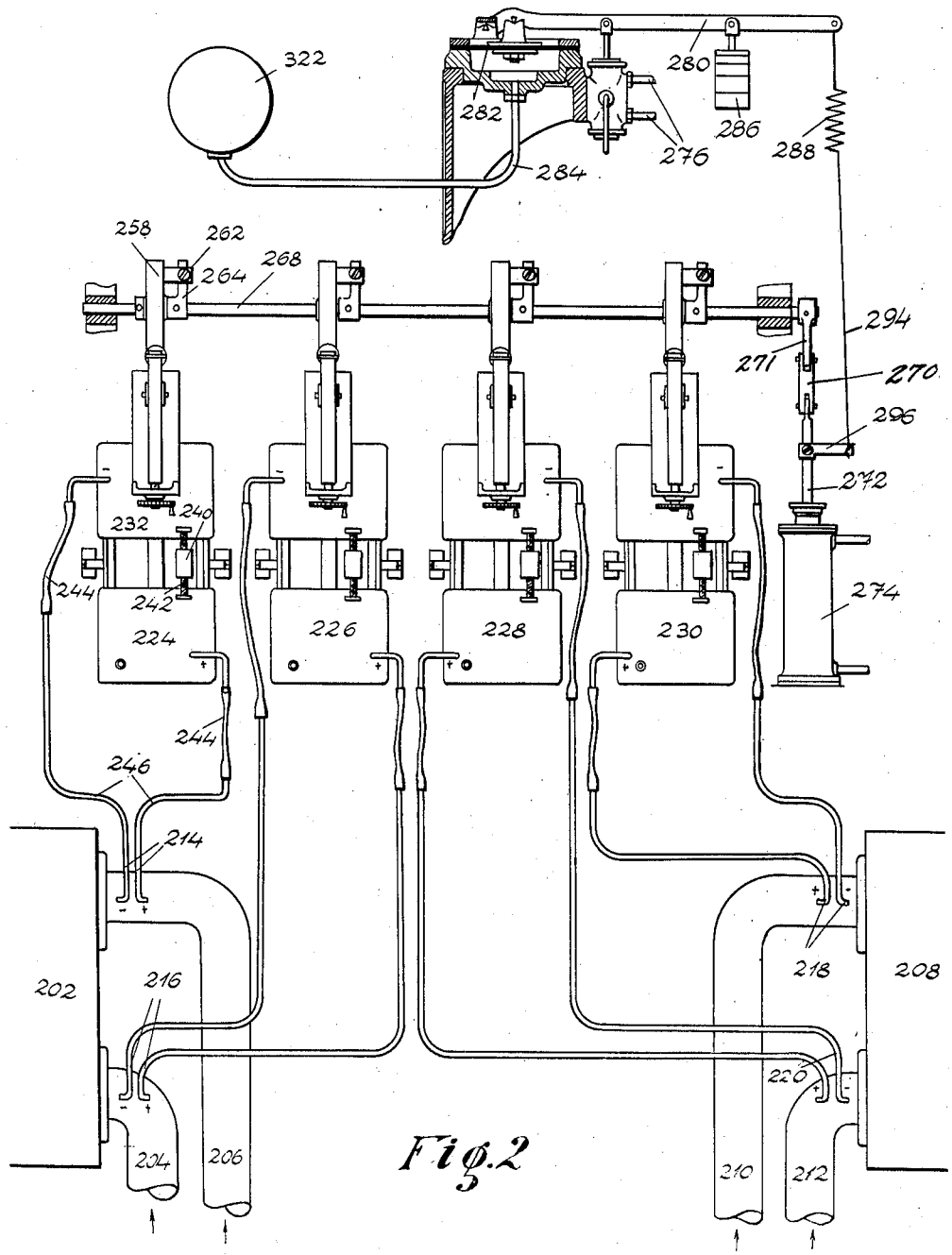

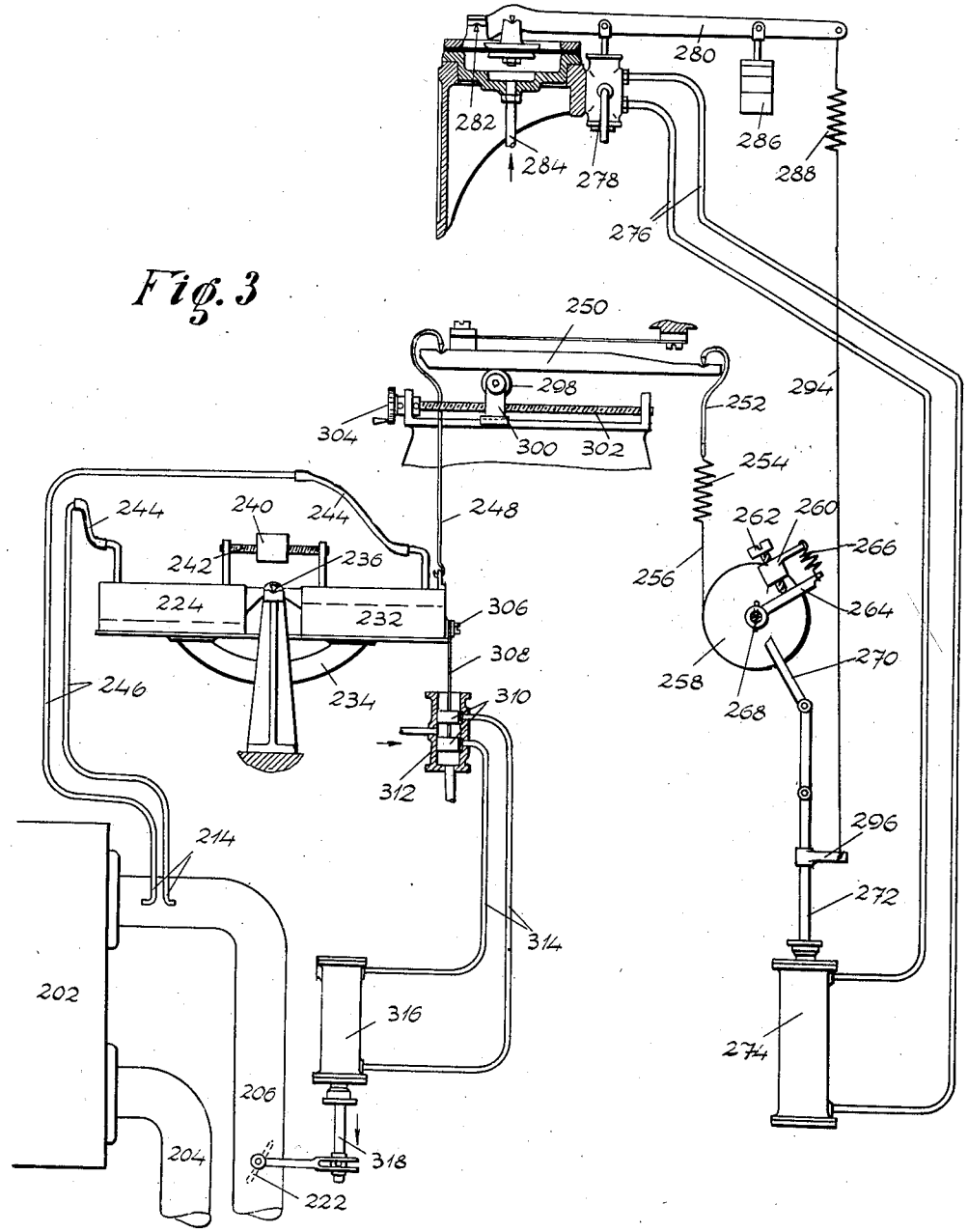

Patented Dec. 18, 1928.

1,695,470

UNITED STATES PATENT OFFICE.

ERICH ROUČKA, OF BLANSKO, CZECHOSLOVAKIA.

MEANS FOR REGULATING COMBUSTION.

Application filed April 20, 1925, Serial No. 24,629, and in Czechoslovakia May 13, 1924.

This invention relates to an automatic device for regulating the rate of combustion in furnaces, especially for boilers. According to the invention, an automatic regulator of the draft pressure, or of the pressure difference dependent on the flow of air or flue gases, is provided with a movable member, the movement of which modifies the effect thereof, said member being actuated by the influence of the fluctuations of the load demand, for example on the boiler, or of the heat requirements, or by a value directly dependent thereon, so that the combustion regulator maintains the draft or pressure difference as determined by the load on the boiler. The regulator according to the invention can also be applied to the simultaneous regulation of groups of furnaces, for example of a range of boilers, or for regulation of a plurality of pressures or pressure differences on one furnace, for example pressure difference caused by flow of combustion gases or the secondary air, or the pressure of gases in the combustion chamber, or pressure produced by the draft fans. In certain cases, a regulator of this kind may be employed both for regulating individual furnaces and for regulating groups of such individually regulated furnaces. The regulator according to the invention operates either by maintaining a definite simple draft at the end of the heating surface or in the flue, or pressure in the combustion chamber or in the forced or induced draft ducts, or a difference in pressure between the front and rear ends of the heating surface, or between two points of heating surface, or again a pressure difference set up directly by the flow of air in the furnace or the flow of the flue gases, and maintains the same until the conditions affecting the rate of combustion have been modified. The constant draft pressure or constant pressure difference is maintained independently of any change in the chimney draft, the air temperature, the regulating of adjacent boilers, or the like, that is to say, without regard to influences which cannot be determined in advance or cannot be maintained constant. The regulated draft or pressure difference is, however, variable automatically in accordance with the amount of heat energy required, withdrawn or consumed, for example the steam furnished by the boiler. The draft or pressure difference, or combustion gas pressure, etc., are determined by means of a special device which is operated in accordance with any condition according to which the pressures are to be controlled, for example, the heat consumption (such as the flow of steam from the boiler) for the time being, or in a simpler manner by any other manifestation of energy, such as the temperature, steam pressure or the like.

A typical embodiment of the regulator according to the invention is illustrated diagrammatically in the drawings, wherein Figure 1 is a schematic side elevation of apparatus embodying the invention;

Figure 2 is a schematic view of a modified form of the invention, portions being shown in top plan view and other portions being in sectional side elevation, and Figure 3 is a schematic sectional side elevation of the apparatus shown in Figure 2, with some parts omitted and other parts added.

In the form of the invention illustrated in Figure 1, the boiler designated 2 forms one of a range supplying steam to a common steam main 22. At the end of the heating surface of the boiler (behind the economizer) is a damper 4 which regulates the draft in front of the same where a pipe 20 branches off. The damper 4 can be actuated from the fireman's position by means of a hand-operated crank 6, with the aid of a cord or chain 8 passing over guide rollers 10. In addition, the adjustment of the damper 4 is effected by means of a pilot-motor 12, the piston rod 14 of which is provided with a clip 16 adapted to be attached to and disconnected from the cord 8, so that the damper 4 can be operated either from the crank 6 by hand, or by the pilot-motor 12. This pilot-motor is connected through a pipe 18 with a governor 88 which regulates the pilot-motor in such a way as to maintain a constant draft in front of the damper 4, the limits of which draft can be determined in advance by members to be hereinafter described.

The draft for the time being in front of the damper 4 is determined by the steam pressure in the steam main header 22. This pressure is transmitted through a pipe 24 into a casing 26 which is closed by a membrane 28, for example of rubber. The steam pressure on the membrane 28 is opposed by the action of a weight 34 and the pull of the spring 36 loading a lever 32 which is mounted by means of a knife edge in a bow on the casing 26, and bears by means of another knife edge on a bearing on the membrane 28. The two knife edges 30 are arranged as close together as possible, so as to give the lever 32 considerable leverage. To the lever 32 is articulated a drawbar 38 of a governor 40 which regulates a pressure medium, such as oil, water, air or the like, in the pilot-motor 50. The end of the piston rod 48 of the pilot-motor 50 carries a head 46 connected by means of a guide rod with rollers 59 adapted to travel on a stationary guide, and forming a fulcrum for a lever 52 supported by a spring 54 which is attached to the frame of the machine at 56. To the head 46 is attached one end of a chain 42 or the like, which passes over guide rollers 44 and is attached at the other end to the tension spring 36. It is clear that within the limits determined by the spring 36 at minimum of tension (piston of the pilot-motor 50 at the extreme right hand position of stroke) and in the condition of maximum tension (pilot-motor piston at the left end of its stroke), any degree of the steam pressure will correspond to a definite leverage of the lever 52. The end 58 of the lever 52 is subjected to the action of a tension spring 60, the pull of which can be adjusted by hand through a self-locking tension device 62. At the other end of the lever 52 a drawbar 74 supports a movable part of a system sensitive to the pressure to be controlled, which movable part is shown as a bell 72, the rim of which dips into a liquid, for example oil, in a vessel 70. The drawbar 74 is also suspended at the point 78 from a balance beam 80 mounted on a knife edge 82. A spring 64, the tension of which can be adjusted by means of a self-locking tension device 66, balances a portion of the weight of the bell 72. Another portion of the weight of the bell is balanced by an adjustable counterpoise 84 on the other end of the lever 80, which lever is connected with a piston of the governor 88 by means of a drawbar 86. The pipe 20 through which the pressure prevailing in front of the damper 4 is transmitted to the bell 72, enters underneath said bell.

Various embodiments are possible within the scope of the invention without departing from the spirit thereof. Thus, for example, the regulator according to the invention is not altered by arranging for the member 48 to be tensioned by the spring 60 and for the roller 59 to be adjusted by hand.

The regulator described operates in the following manner. The draft in front of the damper 4 sets up a negative pressure under the bell 72, so that the outer air depresses the bell, acting against the pull of the springs 64 and 60. In the position shown, the roller 59 is adjusted so that the arm under the pull of the spring 60 is equivalent to nil, and the pressure on the bell 72 is opposed by the pull of the spring 64 alone, so that the pilot-motor 12 and the damper remain stationary. It is therefore clear that by determining the pull of the spring 64 by means of the tension device 66, the minimum draft in front of the damper 4 can be determined in advance, as illustrated.

Under normal running conditions, the rollers 59 take up an intermediate position between the two ends 58 and 76 of the lever 52. If equilibrium prevails in the system, that is to say, when the negative pressure in front of the damper 4 corresponds to the withdrawal of steam from the boiler and therefore to the steam pressure in the pipe 22, the piston of the governors 40 and 88 will be in the inoperative or neutral position, that is to say, the supply of pressure medium to the pilot-motors 50 and 12 will be suspended. The steam pressure acting on the membrane 28 will be balanced by the loading means 34 and 36, and the positive pressure of the outer air on the bell 72, acting against the negative pressure in front of the damper 4, and therefore in the pipe 20, will be balanced, on the one hand by part of the pull of the spring 64 (the other part helping to balance the weight of the bell 72 and bar 74) and by the pull of the spring 60 which acts on the arm 58, 59 against the pull of the bell 72 on the lever arm 76—59. If now, for example, the withdrawal of steam through the pipe 22 falls, the steam pressure therein will rise, on the one hand by reason of the fact that the production of steam is exceeding the consumption, and on the other hand because of the diminished pressure drop of the steam in the superheater and in the pipe. This increased steam pressure is transmitted through the pipe 24 to the membrane 28, which swings the lever 32 in the direction of the arrow. This movement opens the governor 40 and causes the piston of the pilot-motor 50 to travel in the direction of the arrow. At the same time the head 46 of the piston rod 48 exerts a pull on the chain 42 and stretches the spring 36. This movement continues until the increased pull of the spring 36 overcomes the increased steam pressure on the membrane 28 and returns the latter, together with the lever 32, into its neutral position, in which the governor 40 is closed and the movement of the piston in the pilot-motor 50 is interrupted. (With the arrangement in such condition that an increase in the steam pressure can ensue in the pipe 22, the roller 59 cannot be in the position shown, but must occupy some other position to the right of this terminal left-hand position.) During the movement of the head 46 in the direction of the arrow, the rollers 59 move in the same direction under the lever 52, thus modifying the degree of leverage of the latter so that the force of the spring 60 acts with a shorter leverage. This causes the bell 72 to descend in the direction of the arrow, and swings the lever 80 in the anti-clockwise direction, this lever then reversing the governor 88, and the pilot-motor 12 moving the damper 4 toward closed position. This movement continues until the diminished negative pressure under the bell 72 balances the decrease in the moment of the spring 60 on the lever 58—59. When the boiler load or withdrawal of steam increases, the pressure in the pipe 22 falls and the entire system operates in the reverse manner. It is therefore clear that each degree of boiler load, that is of steam withdrawal, corresponds to a definite pressure in the pipe 22, and each degree of steam pressure corresponds to a definite position of the rollers 59 under the lever 52 and therefore also to a definite moment of the pull of the spring 60, which balances the pressure on the bell 72. To this now corresponds a definite position of the damper 4 and therefore also a definite draft, which is then maintained automatically by means of the bell 72 and the pilot-motor 12. This draft will be modified only when the boiler load changes, whereas other external influences have no effect on the draft. This forms an important characteristic of the invention.

That the draft which the apparatus is set to maintain is only momentarily influenced by external changes such as chimney draft, holes in the fire, etc., can be easily understood. If, for instance, the chimney draft should be lowered in consequence, say, of air entering due to one of the boilers of the range being opened for cleaning or repair, thus cooling the hot flue gases and increasing their bulk, this will lessen the draft in front of the damper 4. This result at once affects the bell 72, which then opens the governor 88, the pilot-motor 12 at once imparting an opening movement to the damper 4 in order to restore the original draft as determined by the position of the rollers 59 under the lever 52. Should the chimney draft increase, the operations would be carried out in the reverse manner.

If, for example, the represented terminal position of the rollers 59 corresponds to a pressure of 15 kilogs. per sq. centimetre, and the other terminal position (right) to a pressure of 14 kilogs., the full travel of the rollers 59 corresponds to a change of pressure amounting to 1 kilog. per sq. cm. This pressure change corresponds, for example, to a modification of the draft from a pressure of 3 mm. water gauge, to one of 20 mm. water gauge, a high pressure corresponding to a weak draft, and vice versa. The lever 52 and rollers 59 produce the result that the draft in front of the damper 4 is modified not in direct ratio to the position of the rollers 59, but in an approximately squared ratio, which corresponds to a nearly equivalent change in the rate of combustion, since for a given condition of the fuel on the grate, the flow of air is in quadratic relation to the rate of combustion. This result is attained because the force with which the spring 60 acts on the end 76 of the lever 52 is in an approximately quadratic ratio to the position of the rollers 59 during their changes in position.

As already mentioned, the tension device 66, and therefore the pull of the spring 64, together with the weight 84, determine the minimum draft of the boiler under minimum load, when the rollers 59 are in the position shown; whereas the tension device 62 of the spring 60 determines the draft when the rollers 59 are in their other (right-hand) end position (full load) or in any intermediate position. The varying tension of the spring 60 does not affect the quadratic relation in the regulation of the draft, but merely determines a constant thereof.

The regulator described may also be applied to the boilers in a range, which supply steam to a common main 22; and by adjusting the springs 60 for each boiler, the loading of the individual boilers of the range can be limited. The tension device 62 is provided with a scale indicating the draft in terms of millimetres or inches of water gauge. The tension device 62 is adjusted to the draft which it is desired to maintain, for the boiler in question, when the same is working under full load; while, on the other hand, a fraction of the full load in the pipe 22 effects a corresponding fractional modification of the draft, independently in each boiler. In this way, it is possible to determine with certainty, in advence, what share each boiler is to take in the supply of steam. This enables different boilers supplying a common steam main, to be loaded independently in accordance with their characteristic for the time being. For example, it may be so arranged that, when running under full load, a freshly cleaned or new boiler supplies about 30 kilogs. of steam per sq. metre of heating surface, while a boiler that is partly foul supplies only 25 kilogs., an old boiler only 20 kilogs., and an old boiler soon due to be cleaned supplies only 15 kilogs. In this way the plant can be utilized with accuracy as regards output capacity and economy. Such an arrangement in combination with a suitable bottom draft regulator, and a fuel feed and feed water regulator, enables boilers to be run in a completely automatic manner.

In regulating ranges of boilers, the steam pressure effecting such regulation is drawn from a main 22 common to the whole range. In such case, care must be taken to ensure that the point at which the steam is drawn off for that purpose is correctly situated with regard to the resistance the flow of steam from the various boilers has to overcome. On this account, the situation of the pipe 24 is chosen so that the resistances offered to the flow of steam from the several boilers are distributed as symmetrically as possible with respect to said pipe 24.

In regulating a plurality of boilers, this arrangement can also be simplified by employing for all the boilers a single organ 26—36, 40, 50 which is sensitive to the steam pressure or acts directly under the loading effect of the steam demand, which organ operates in the case of each boiler against a separate organ (70, 72, 88—12) for the maintenance of a definite draft or pressure difference. For example, in the embodiment shown, the drawbar 48 might be made several times as long and be provided with a plurality of rollers 59 arranged in series, each of them determining the transmission ratio of another lever 52 and the moment of another spring 60. Each of the levers 52 would influence a draft regulator 72, 80, 88, 12. Each of these regulators could be adjusted by hand-operated tension devices 62, 66 in accordance with the maximum loading of the boiler concerned. A similar arrangement could be employed for regulating individual boilers provided with a number of separately controlled dampers, for instance, when the boiler is divided into two halves, when a bottom draft admitted through a plurality of passages is to be controlled, where damper and forced or induced draft blower control is desired, or where secondary and tertiary air is to be controlled. In this case, the common organ 26—36, 40, 50 would serve all the regulating dampers and the blower speed control devices.

By using a double bell 72, the pressure difference or draft could be regulated either in the pipe 20 and in the draft above the grate, or else the pressure difference produced by the flow of air under the grate, for example by a nozzle or Pitot tube or the like, or finally, the pressure difference set up by the flow of the flue gases, said gases influencing a Pitot tube set up in the smoke flue.

Figure 1 of the drawing represents the regulator according to the invention as applied to a range of boilers comprising two boilers 2 and 102. Through the elongated piston rod 48, the pilot-motor 50 also regulates the second boiler 102, by means of the previously described arrangement 26—36, 40 common to both. The degree of draft in front of the damper 104 of the boiler 102 is transmitted to the under side of the float 172 by means of the pipe 120, and by means of the governor 188 this regulator controls the pilot-motor 112 which adjusts the damper 104. The share of the boiler 102 in the total supply of steam furnished by the two boilers 2 and 102 which deliver steam into the common main 22 by way of connecting pipes 23 and 123, can be determined in advance by means of the tension device 162 of the spring 160. The tension device 166 with the spring 164 determines in turn, the minimum draft which is to be maintained in front of the flue gas damper 104 under minimum boiler load of the plant.

Figures 2 and 3 show a regulating arrangement in which the pilot-motor 274 (corresponding to the pilot-motor 50 of Figure 1) applies a greater or less degree of tension to the springs 254, instead of operating the rollers 59 and 159. On the other hand, the adjustment of the share of one or other of the boilers in the provision of steam is determined by means of the roller 298 which is set by the hand wheel 304, instead of by the springs 60 and 160.

In Figures 2 and 3, 202 and 208 denote two boilers, each fitted with two furnaces each of which is supplied with air through a separate pipe. Pitot tubes 216, 214 are arranged in these air supply pipes 204, 206, of the boiler 202, while two Pitot tubes 218, 220 are provided in the air supply pipes 210, 212 of the boiler 208. From each of these Pitot tubes two fixed pipes lead to apparatus 224, 226, 228, 220, one of which is allotted to each of the air supply pipes, and all of which are alike. On this account only the one system 224 will be described. Said systems are illustrated in plan view in Figure 2 and inside elevation in Figure 3. A liquid balance consisting of two vessels 224 and 232 is connected to the fixed pipes 246 by means of flexible rubber tubing 244, the two vessels being in mutual communication by means of a pipe 234 (Figure 3). The sealing liquid contained in the liquid balance is exposed to the pressure difference corresponding to the intensity of the flow of air through the pipe 206. The balance is mounted on knife edges 236 and is balanced by means of a sliding weight 240 adapted to be moved along the spindle 242. The pressure difference acting on the balance is transmitted by means of the drawbar 248 to one end of the lever 250, on the other end of which the spring 254 acts by means of the hook 252. As is lever 52 in Figure 1, the lever 250 is supported by a roller 298 which is mounted in the standard 300 and is adapted to be adjusted from a hand wheel 304 by means of the spindle 302, so that the ratio of transmission of the two-arm lever 250 can be adjusted at will.

By means of an arrangement similar to that of 22—30 of Figure 1, attached to the common steam main 322, by way of the pipe 284, the steam pressure acts on the membrane 282. By means of the governor 278 corresponding to 40 of Figure 1, the lever 280 controls the pilot-motor 274 with which the governor is connected by pipes 276. The return movement of the lever 280, which is loaded by the weight 286, is effected by the cross-head 296 of the piston rod 272 by means of the traction member 294 which tensions or relieves the spring 288. The piston rod 272 actuates the shaft 268 by means of the link 270 connected to an arm 271 on the shaft (see Fig. 2). Rotatably mounted on this shaft are an arm 264 and a disk 258. This disk carries a member 260 with the screw 262 which latter is pressed tightly against the arm 264 by means of a spring 266. This screw 262 enables the tension of the spring 254 to be varied for a given position on the shaft 268. A degree of tension varying with the position of the piston rod 272, is applied to the spring 254 by means of a metal band 256 around the disk 258; and this force determines the difference which is to be regulated at the Pitot tube 214, and which at the same time depends on the position of the roller 298. This arrangement of the other liquid balances 226, 228 and 250 is exactly the same. Each air supply pipe is provided with a damper or other air regulating device 222, said damper being adjusted by the piston rod 318 of the pilot-motor 316, as illustrated in connection with pipe 206 in Figure 3. Each pilot-motor of a group is controlled by its allotted governor 312. The control is effected by a governor piston 310 attached to the rod 308 and connected to the liquid balance by means of a screw 306. The arrangement operates in a similar manner to that of Figure 1, the pilot-motor 274 adjusting the several allotted springs 254 in accordance with the heat requirements, while in accordance with the position of the various allotted rollers 298 in the several systems, the rate of flow of the air in the several air supply pipes is regulated by the pilot-motors as in the case of 316, until the balances 224, etc., attain their neutral position. It is thus possible not only to regulate the load on the various boilers conjointly but also to regulate or adjust the supply of air to the several divisions of a furnace to a different degree.

In the appended claims, the term pressure is intended to include positive or negative combustion gas or air pressure, or gas or air pressure differences caused by flow of combustion gases or air, respectively.

Having thus described the invention, what I claim is:

1. Furnace controlling apparatus comprising means for varying a pressure in a furnace, means movably responsive to said pressure, means including a lever system and spring means associated therewith to produce a variable mechanical force cooperating with said responsive means to balance the same, a governor actuated by cooperation of said responsive means and the third-mentioned means upon departures from balanced relation thereof to control the first-mentioned means, means responsive to variations in the heat demand, and movable means controlled by the last-mentioned responsive means in accordance with variations in the heat demand to cooperate with the third-mentioned means and vary the mechanical force exerted by said spring means upon the second-mentioned means.

2. Furnace controlling apparatus comprising means for varying a pressure in a furnace, means movably responsive to said pressure, means including a lever system having a variable fulcrum and spring means associated therewith to produce a variable mechanical force cooperating with said responsive means to balance the same, a governor actuated by cooperation of said responsive means and the third-mentioned means upon departures from balanced relation thereof to control the first-mentioned means, means responsive to variations in the heat demand, and movable means controlled by the last-mentioned responsive means in accordance with variations in the heat demand to vary the position of said variable fulcrum.

3. Furnace controlling apparatus comprising means for varying a pressure in a furnace, means movably responsive to said pressure, means including a lever system having a variable fulcrum cooperating with said responsive means to balance the same, a governor actuated by cooperation of said responsive means and the third-mentioned means upon departures from balanced relation thereof to control the first-mentioned means, means responsive to variations in the heat demand, and movable means controlled by the last-mentioned responsive means in accordance with variations in the heat demand to vary the position of said variable fulcrum.

4. Furnace controlling apparatus comprising means for varying a pressure in a furnace, means movably responsive to said pressure, means including a lever system having variable leverage cooperating with said responsive means to balance the same, a governor actuated by cooperation of said responsive means and the third-mentioned means upon departures from balanced relation thereof to control the first-mentioned means, means responsive to variations in the heat demand, means for varying the leverage of the third-mentioned means, movable means controlled by the last mentioned responsive means, and a rigid connection between said movable means and said means for varying said leverage whereby said leverage is varied in accordance with the heat demand.

5. The apparatus set forth in claim 3 wherein there is a rigid connection between the last-mentioned means and said variable fulcrum.

6. The apparatus set forth in claim 3 wherein the last-mentioned means is operatively connected to said fulcrum roller by a rod.

7. Furnace controlling apparatus comprising a plurality of means each for varying a different pressure in a furnace, a plurality of means each movably responsive to one of said pressures, a plurality of means each comprising a lever system having variable leverage cooperating with one of said responsive means to balance the same, a plurality of governors one for each of the first-mentioned means and each actuated by cooperation of the respective responsive means and the third-mentioned means upon departures from balanced relation thereof, means responsive to variations in the heat demand, a plurality of means one for varying the leverage of each said lever systems, movable means controlled by the last-mentioned responsive means in accordance with variations in the heat demand, and a rigid connection between the last-mentioned means and all of said means for varying said leverage.

8. Furnace controlling apparatus comprising a plurality of means each for varying a different pressure in a furnace, a plurality of means each movably responsive to one of said pressures, a plurality of means each comprising a lever system having variable leverage cooperating with one of said responsive means to balance the same, a plurality of governors one for each of the first-mentioned means and each actuated by cooperation of the respective responsive means and the third-mentioned means upon departures from balanced relation thereof, means responsive to variations in the heat demand, a plurality of means one for varying the leverage of each said lever systems, movable means controlled by the last-mentioned responsive means in accordance with variations in the heat demand, and a rod operatively connecting all of said leverage varying means with the last-mentioned means.

9. The apparatus set forth in claim 7 wherein said means for varying said leverage are movable fulcrums.

10. Furnace controlling apparatus comprising a plurality of means each for varying a different pressure in a furnace, a plurality of means each movably responsive to one of said pressures, a plurality of means each comprising a lever system having variable leverage cooperating with one of said responsive means to balance the same, a plurality of governors one for each of the first mentioned means and each actuated by cooperation of the respective responsive means and the third-mentioned means upon departures from balanced relation thereof, means movably responsive to the condition according to which said pressures are to be controlled, a governor actuated by the last-mentioned responsive means, a plurality of means for varying the leverage of each of said lever systems, a pilot-motor controlled by the last-mentioned governor, and a rigid connection between said pilot motor and all of said leverage varying means whereby said leverage is varied in accordance with variations in said condition.

11. The apparatus set forth in claim 1 with the addition of means for exerting an additional variable mechanical force on said lever system to predetermine the minimum pressure to be regulated.

12. The apparatus set forth in claim 4 with the addition of means for exerting a variable mechanical force on said lever system to adjust the apparatus to maintain said pressure at a predetermined minimum.

In testimony whereof I have hereunto set my hand.

ERICH ROUČKA.